United States Patent Office 3,202,672
Patented Aug. 24, 1965

3,202,672
4-AMINO-2,9-DIMETHYL-1,2,3,4-TETRAHYDRO-9H-PYRIDO[3,4-b]INDOLE AND ITS ACID ADDITION SALTS
Jacob Szmuszkovicz, Kalamazoo, Mich., assignor to The Upjohn Company, Kalamazoo, Mich., a corporation of Delaware
No Drawing. Filed Nov. 6, 1963, Ser. No. 321,805
2 Claims. (Cl. 260—296)

This invention relates to a novel indole derivative and acid addition salts thereof.

The compounds of this invention include 4-amino-2,9-dimethyl-1,2,3,4-tetrahydro-9H-pyrido[3,4-b]indole of the formula

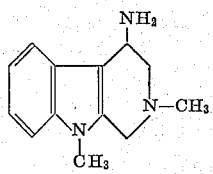

and the physiologically acceptable acid addition salts thereof, such as the hydrochloride, hydrobromide, acetate, pyruvate, sulfate, phosphate, citrate, tartrate, salicylate, lactate, succinate, benzoate, nitrate, p-toluenesulfonate and the like.

The products and intermediates of this invention are named in accord with the basic structure having position numbered as follows

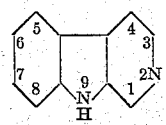

The compounds of this invention demonstrate monamine oxidase-inhibiting activity and can be administered to humans and animals as the primary active ingredients of conventional pharmaceutical forms such as tablets, capsules, elixirs, injectable solutions and suspensions and the like for treatment of metal depression. Additionally, the free base forms a salt with fluosilicic acid which is useful as a mothproofing agent in accord with U.S. Patents 1,915,334 and 2,075,359. The free base also forms a salt with thiocyanic acid which condenses with formaldehyde to form resinous materials useful as pickling inhibitors according to U.S. Patents 2,425,320 and 2,606,155.

In preparing the products of this invention, the known 2,9-dimethyl-1,3,4-trioxo-1,2,3,4-tetrahydro - 9H - pyrido [3,4-b]-indole is reduced to 2,9-dimethyl-4-hydroxy-1,2,3,4-tetrahydro-9H-pyrido[3,4-b]indole, which is reacted with ethyl chloroformate followed by ammonia, to give the desired 4-amino-2,9-dimethyl-1,2,3,4-tetrahydro-9H-pyrido[3,4-b]indole. Conventional treatment of the free base with the appropriate acid, such as hydrochloric, hydrobromic, acetic and the like produces the corresponding acid addition salt as alluded to above.

The following preparation and examples illustrate the synthesis of representative products of this invention but are not to be construed as limiting the scope thereof.

PREPARATION 1

2,9-dimethyl-4-hydroxy-1,2,3,4-tetrahydro-9H-pyrido [3,4-b]indole

Powdered 2,9-dimethyl-1,3,4-trioxo-1,2,3,4-tetrahydro-9H-pyrido[3,4-b]indole (1 gm., 4.14 mmole) was added all at once to a solution of lithium aluminum hydride (2 gm.) in 100 ml. of tetrahydrofuran under nitrogen. The resulting mixture was refluxed 6 hours, and allowed to stand 48 hours. It was cooled in ice and decomposed in succession with 2 ml. of water, 2 ml. of 15% sodium hydroxide solution and 6 ml. of water. The mixture was then stirred for 1 hour at room temperature, filtered and the cake washed with tetrahydrofuran. The pale yellow filtrate was evaporated to dryness in vacuo to give 0.922 gm. of oil. A solution of this oil in benzene was extracted four times with 5% acetic acid (total, 50 ml.). The extracts were washed once with ether and then basified with 15% sodium hydroxide. The resulting crystalline mixture was extracted with methylene chloride. The extracts were washed with saturated salt solution, dried with sodium sulfate and evaporated to give 0.688 gm. of oil. Several crystallizations from Skellysolve B (hexane hydrocarbons) and decantation from a small amount of insoluble material afforded .26 gm. (29% yield) of desired product as clusters, M.P. 126–128° C. Ultraviolet spectrum (ethanol) showed λ max. 224 (34,950); sh 275 (6,150); 281 (6,600); 291 (5,650). Infrared spectrum (mineral oil mull) showed OH: 3325, 3200; tert. amine: 2775; C=C: 1615, 1590.

Analysis.—Calcd. for $C_{13}H_{16}N_2O$: C, 72.19; H, 7.46; N, 12.95; N.E., 216. Found: C, 72.23; H, 7.37; N, 13.11; N.E., 227.

EXAMPLE 1

4-amino-2,9-dimethyl-1,2,3,4-tetrahydro-9H-pyrido [3,4-b]indole

Ethyl chloroformate (4.5 ml., 0.0475 mole) was added to an ice cooled solution of the 4-hydroxy compound (1.08 gm., 0.005 mole) in 20 ml. of pyridine during 3 minutes with swirling. The resulting suspension was allowed to stand ice cooled for 2 hours and then at room temperature overnight. The mixture was cooled in ice, 10 gm. of ice and 20 ml. of water were added and the solution was extracted with ether (2×25 ml.). The aqueous extract was cooled in ice and basified with 10 ml. of aqueous ammonia solution (28%). The resulting yellow solution was allowed to stand at room temperature for 1 hour and 25 minutes and was then extracted with ether (4×50 ml.). The ether extract was washed with water, saturated salt solution, dried over sodium sulfate and evaporated to give 0.742 gm. of partially crystalline mixture. Infrared spectrum showed no band in the ester region. The crude product was sublimed at 87–93° C. (0.1 mm.) to give 0.450 gm. (38% yield) of desired product as prisms, M.P. 111–114° C. The analytical sample was prepared by recrystallization from ether-Skellysolve B, M.P. 112.5–114° C. Ultraviolet spectrum (ethanol) showed λ max. 223 (37,600); sh 276 (6,900); 282 (7,450); sh 289 (6,450). Infrared spectrum (mineral oil mull) showed NH: 3340, 3250, 3180; =CH: 3080, 3040; tert. amine: 2780, 2760; C=C: 1640, 1595, 1582, 1570.

*Analysis.*—Calcd. for $C_{13}H_{17}N_3$: C, 72.52; H, 7.96; N, 19.52. Found: C, 72.52; H, 7.66; N, 19.37.

Example 2

Salts

Acid addition salts of the product of Example 1 are prepared conventionally by treating the indole with the desired acid, such as hydrochloric, hydrobromic, acetic, pyruvic, sulfuric, phosphoric, citric, tartaric, salicylic, lactic, succinic, benzoic, nitric, p-toluenesulfonic and the like, followed by customary purification.

What is claimed is:

1. A compound selected from the group consisting of (1) 4-amino-2,9 - dimethyl-1,2,3,4-tetrahydro-9H-pyrido [3,4-b]indole of the formula

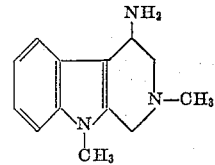

and (2) physiologically acceptable acid addition salts thereof.

2. 4 - amino-2,9-dimethyl-1,2,3,4-tetrahydro-9H-pyrido [3,4-b]indole.

No references cited.

WALTER A. MODANCE, *Primary Examiner.*